United States Patent
Maurel et al.

(10) Patent No.: US 10,072,695 B2
(45) Date of Patent: Sep. 11, 2018

(54) FIXING ELEMENT FOR COMPONENTS OF AN ASSEMBLY

(71) Applicant: AIRBUS OPERATIONS S.A.S., Toulouse (FR)

(72) Inventors: Jean-Philippe Maurel, Colomiers (FR); Frederic Labal, Rouffiac-Tolosan (FR); Jean-Luc Martres, Saint-Jory (FR)

(73) Assignee: Airbus Operations (SAS), Toulouse (FR)

( * ) Notice: Subject to any disclaimer, the term of this patent is extended or adjusted under 35 U.S.C. 154(b) by 413 days.

(21) Appl. No.: 14/547,802

(22) Filed: Nov. 19, 2014

(65) Prior Publication Data

US 2015/0147136 A1    May 28, 2015

(30) Foreign Application Priority Data

Nov. 25, 2013  (FR) ..................................... 13 61603

(51) Int. Cl.
| | |
|---|---|
| *F16B 15/00* | (2006.01) |
| *F16B 33/00* | (2006.01) |
| *F16B 33/06* | (2006.01) |
| *F16B 35/00* | (2006.01) |

(52) U.S. Cl.
CPC ............ *F16B 33/008* (2013.01); *F16B 33/06* (2013.01); *F16B 35/00* (2013.01)

(58) Field of Classification Search
CPC ........ B64D 45/02; C24D 11/022; F16B 33/06
USPC ........................................................ 411/424
See application file for complete search history.

(56) References Cited

U.S. PATENT DOCUMENTS

| | | | | |
|---|---|---|---|---|
| 2,518,468 | A * | 8/1950 | Harding | F16B 33/06 411/269 |
| 2,934,480 | A † | 4/1960 | Slomin | |
| 3,075,896 | A † | 1/1963 | McGraw | |
| 3,407,903 | A * | 10/1968 | Sansabrino | F16B 33/00 16/274 |
| 3,799,848 | A * | 3/1974 | Kolic | C25D 7/0614 205/201 |

(Continued)

FOREIGN PATENT DOCUMENTS

| | | |
|---|---|---|
| CN | 202100582 | 1/2012 |
| DE | 19840298 A1 | 3/2000 |

(Continued)

OTHER PUBLICATIONS

French Patent Office, French Search Report for French Patent Application 1361603 dated Aug. 14, 2015.

(Continued)

*Primary Examiner* — Gary W Estremsky
(74) *Attorney, Agent, or Firm* — Greer, Burns & Crain, Ltd.

(57) ABSTRACT

A fixing element for components of an assembly, comprising a rod which is formed by a cylindrical shaft and an end, the rod being a metal component which is at least partially surface-treated by means of anode oxidation and coated over at least a portion of the cylindrical shaft with a lubricating coating. Such a fixing element enables the electrical continuity to be ensured with the components during mounting with moderate interference in the assembly.

18 Claims, 5 Drawing Sheets

(56) References Cited

U.S. PATENT DOCUMENTS

| | | | | |
|---|---|---|---|---|
| 3,831,213 | A | * | 8/1974 | Bedi ................ B23G 9/00 411/302 |
| 3,983,304 | A | * | 9/1976 | Sekhon ............. C09D 161/06 29/34 B |
| 4,472,096 | A | * | 9/1984 | Ruhl ................. F16B 19/05 411/361 |
| 4,671,583 | A | * | 6/1987 | Olson ................ B64D 45/02 439/801 |
| 5,685,680 | A | * | 11/1997 | Duffy ................ B05D 3/12 219/99 |
| 5,922,472 | A | * | 7/1999 | Keener ............... B21K 1/58 148/251 |
| 6,149,363 | A | * | 11/2000 | March ................ B21H 3/06 411/366.1 |
| 6,228,241 | B1 | * | 5/2001 | Alwitt ............... C25D 11/20 205/105 |
| 7,192,639 | B2 | * | 3/2007 | Philipson ............ C09D 5/082 428/330 |
| 7,275,903 | B2 | * | 10/2007 | Schultz ............. F16B 323/0038 29/525.11 |
| 7,655,320 | B2 | | 2/2010 | Keener et al. |
| 9,447,809 | B2 | * | 9/2016 | Regnard ........... F16B 25/0021 |
| 2004/0131943 | A1 | † | 7/2004 | Brown |
| 2009/0285654 | A1 | * | 11/2009 | Stecher .............. F16B 2/04 411/426 |
| 2010/0124472 | A1 | * | 5/2010 | Nguyen ............. B64D 45/02 411/337 |

FOREIGN PATENT DOCUMENTS

| | | |
|---|---|---|
| DE | 102010040338 A1 | 3/2012 |
| EP | 2406336 A1 | 1/2012 |
| FR | 3008754 A | 9/1960 |
| FR | 2851580 A1 | 8/2004 |
| FR | 2855836 A1 | 12/2004 |
| FR | 3008754 † | 1/2015 |
| FR | 3008754 A | 1/2015 |
| JP | 2009030736 A | 2/2009 |
| JP | 2009127777 A | 6/2009 |
| WO | 2007122079 A1 | 8/2007 |
| WO | 2012118855 A2 | 9/2012 |
| WO | 2015007957 A1 | 1/2015 |

OTHER PUBLICATIONS

French Patent Office, French Search Report for French Patent Application 1361603 dated Jul. 16, 2014.

Office Action, dated Aug. 25, 2017, from the State Intellectual Property Office of the People's Republic of China for corresponding CN Application No. 201410683486.3.

Third Party Observations, dated Aug. 25, 2017, from the State Intellectual Property Office of the People's Republic of China for corresponding CN Application No. 201410683486.3.

Benoit Regnard; Certified English Translation of FR 1357157, filed Jul. 19, 2013; 9 pages.†

Jean-Philippe Maurel; Third Party Submission; U.S. Appl. No. 14/547,802; Confirmation No. 5210; 16 pages.†

\* cited by examiner
† cited by third party

FIXING ELEMENT FOR COMPONENTS OF AN ASSEMBLY

CROSS-REFERENCE TO RELATED APPLICATION

This application claims priority to French Patent Application No. 1361603, filed Nov. 25, 2013, which is incorporated herein by reference in its entirety.

TECHNICAL FIELD

The subject matter described herein relates to a fixing element for components of an assembly. It also relates to an assembly comprising at least two components which are fixed to each other by the fixing element.

BACKGROUND

The embodiment described herein generally relates to fixing members for securing components of an assembly, and particularly for securing such in an aircraft since such assemblies must be protected against the risks associated with lightning strikes.

The fixing element is generally mounted with moderate interference in the components of the assembly. It comprises a rod which is formed by a cylindrical shaft and an end which may or may not be threaded. The end of the shaft cooperates during assembly with, for example, a nut or a crimping ring.

During assembly with moderate interference, the cylindrical shaft has a diameter which is substantially larger than the hole that is produced in the components of the assembly and that are intended to receive the fixing element.

The assembly of such a fixing element in components must ensure good electrical conductivity between the fixing element and the components of the assembly. In particular, the electrical conductivity must be sufficient and compatible with the risks associated with lightning strikes, in particular, when the fixing element is intended for an aircraft assembly that is arranged near a fuel zone. For example, in the region of an aircraft wing.

When the electrical conductivity of the fixing element used is not sufficient, it is necessary to safeguard the fixing with respect to lightning by using a protection cap that covers the portion of the fixing element located at the side of the end that cooperates with a nut or a crimping ring. Such a protection cap (also called a "nut cap") is shown and described in document WO 2012/118855. However, the use of a protection cap requires the production and the assembly of additional components, thus increasing the installation time of the fixing element and the weight associated with this fixing element, a critical aspect in aircraft applications.

Fixing elements are also known that provide good electrical conductivity as a result of the application of a surface treatment of the rod by means of anode oxidation. However, this surface treatment increases the installation forces required for assembling the fixing element in the hole with interference for the components to be assembled. Thus, the fixing elements which provide good electrical conductivity by means of anode oxidation of their surface are difficult to install. Thus, it is an object of the embodiments described herein to overcome at least one of the above-mentioned disadvantages. To this end, the embodiments relates to a fixing element for components of an assembly, comprising a rod that is formed by a cylindrical shaft and an end, the rod being a metal component that is at least partially surface-treated by means of anode oxidation.

The rod is coated over at least a portion of the cylindrical shaft with a lubricating coating.

Because of the association on the rod of the fixing element, a lubricating coating, and a surface portion that is treated by means of anode oxidation, it is possible to assemble, with interference, a fixing element that provides good electrical conductivity and thus good electrical continuity for the assembled components. Such a fixing element does not require the use of a protection cap to protect it from the risks associated with lightning strikes.

According to a first embodiment of the cylindrical shaft comprises at least a first strip that extends in the length of the cylindrical shaft and that is surface-treated by means of anode oxidation, and at least a second strip that extends in the length of the cylindrical shaft and which is coated with a lubricating coating.

In a further embodiment, the cylindrical shaft comprises a plurality of first strips that are surface-treated by means of anode oxidation and a plurality of second strips that are coated with a lubricating coating, the first and second strips extending over angular sectors that are distributed at the periphery of the cylindrical shaft.

In yet another embodiment, the first and second strips are distributed in a uniform manner at the periphery of the cylindrical shaft.

In a further embodiment, the cylindrical shaft comprises three first strips that are surface-treated by means of anode oxidation and that extends over three angular sectors of 45°, respectively, and that are separated in pairs by means of a second strip that is covered with the lubricating coating which extends over an angular sector of 75°.

In a still further embodiment, the cylindrical shaft comprises two first strips that are surface-treated by means of anode oxidation and extend over two angular sectors between 90 and 150°, respectively. Two second strips are covered with a lubricating coating which extends over two angular sectors between 30 and 90°, respectively.

The rod may be titanium and/or at least partially surface-treated by means of sulphuric anode oxidation. The lubricating coating may be a coating based on phenolic resin.

In a further embodiment, an assembly comprises at least two components which are fixed to each other by means of a fixing element.

These and other specific features and advantages will be further appreciated from the following description.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Various embodiments of a fixing element for components of an assembly will now be described with reference to FIGS. 1 through 6. It should be noted that there are illustrated in the figures various layers of coatings or surface-treatments of the fixing element, the thickness of the layers being greatly exaggerated compared with the dimensions of the fixing element, purely for the purposes of understanding and illustration.

Figure 1A:
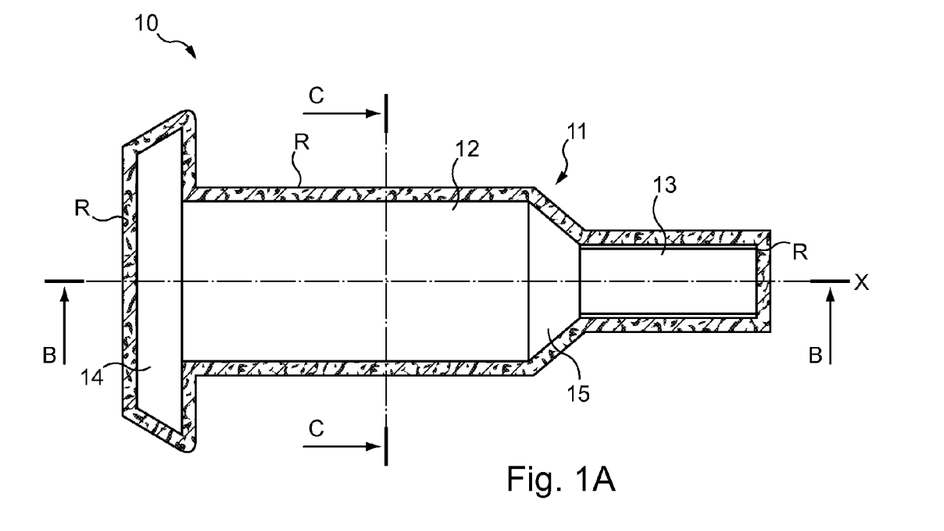
FIG. 1A is a schematic longitudinal section of a fixing element according to an embodiment.
Figure 1B:
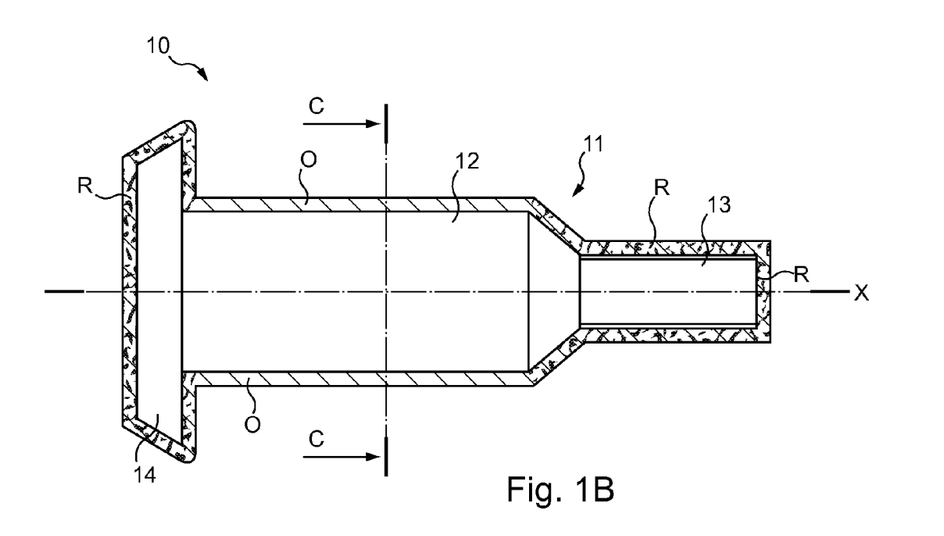
FIG. 1B is a schematic longitudinal section along line BB in FIG. 1A.
Figure 1C:
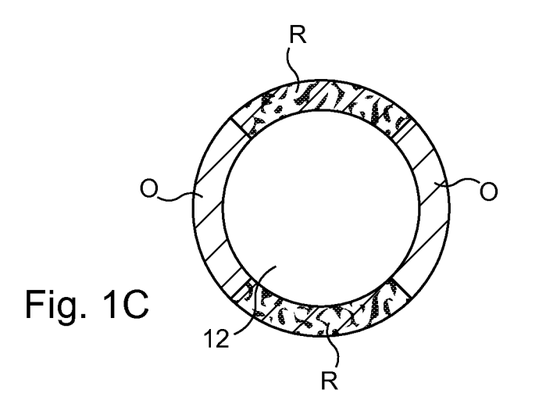
FIG. 1C is a schematic cross-section along line CC in FIG. 1A.

FIGS. 1A, 1B and 1C illustrate a first embodiment of a fixing element for the components of an assembly. The fixing element 10 comprises a rod 11 which is formed by a cylindrical shaft 12 and an end 13. In this instance and in a non-limiting manner, the end 13 of the rod 11 is a threaded end that is adapted to cooperate with a nut (not illustrated in FIGS. 1A, 1B and 1C). The rod 11 is also provided with a head 14 which is located at the end opposite the threaded end 13 of the rod 11.

The cylindrical shaft 12 has a diameter which is substantially greater than the diameter of the threaded end 13 so that the rod 11 comprises a frustoconical connection portion 15 between the cylindrical shaft 12 and the end 13. The fixing element 10 is a metal component and may be produced, for example, from titanium. The use of titanium is particularly preferred for its properties of conductivity and corrosion resistance. Of course, there may be used other metal materials, for example, a nickel alloy of the type Inconel®. In this embodiment, the head 14 and the end 13 of the rod 11 are covered with a lubricating coating R.

The cylindrical shaft 12 comprises both a portion that is coated with a lubricating coating R and a portion that is surface-treated by means of anode oxidation O or the like. As can clearly be seen in FIG. 1C, in this embodiment, the cylindrical shaft 12 comprises two strips which are surface-treated by means of anode oxidation O and two strips which are coated with a lubricating coating R. The strips extend, in this instance, the length of the cylindrical shaft 1, that is to say, in the longitudinal direction X of the fixing element 10, as illustrated in FIGS. 1A and 1B.

The strips that are surface-treated by means of anode oxidation O and the strips that are coated with a lubricating coating R extend over angular sectors of the periphery of the cylindrical shaft 12. In the embodiment illustrated in FIG. 1C, the strips that are surface-treated by means of anode oxidation O and the strips which are coated with a lubricating coating R are distributed in a uniform manner around the periphery of the cylindrical shaft 12. In this manner, the two strips that are surface-treated by means of anode oxidation O extend over two angular sectors of 90°, respectively, and the two strips that are coated with the lubricating coating R extend around two angular sectors of 90°, respectively. By way of non-limiting example, the treatment by means of anode oxidation of the rod 11 may be a treatment comprising sulphuric anode oxidation (SAO).

Treatment by means of anode oxidation results in good electrical conductivity at the rod 11 and in particular at the cylindrical shaft 12 of the fixing element 10.

The surface-treatment of a metal rod by means of anode oxidation of a metal rod is known and does not need to be further described herein. However, in so far as only a portion of the surface of the cylindrical shaft 12 of rod 11 is surface-treated by means of anode oxidation, a cover or mask will be required on the portions of the fixing element which are not subjected to anode oxidation. The thickness of the surface-treatment by means of anode oxidation is approximately 0.5 µm. It should be noted that in the embodiment of FIG. 1C, over 50% of the outer surface of cylindrical shaft 12 is treated with anode oxidation O.

The lubricating coating R comprises, for example, a coating based on phenolic resin. It may, for example, be comprised of a coating based on phenolic resin that includes anti-corrosion pigments and/or lubrication pigments. Such a coating is, in particular, marketed under the mark HI-KOTE® and, for example, under the name HI-KOTE® INC.

Insofar as only one portion of the fixing element 10, and in particular of the rod 11, is coated with the lubricating coating R, it will be applied, for example, by means of atomization or of immersion, using a protective cover or mask applied to the portions of the rod 11 that are not covered with the lubricating coating R. The thickness of the lubricating coating R on the rod 11 is approximately 5 µm.

Of course, when the cylindrical shaft 12 comprises a strip that is surface-treated by means of anode oxidation O and a strip that is coated with the lubricating coating R, the arrangement of the longitudinal strips around the cylindrical shaft 12 is not limited to the embodiment described above. For example, the cylindrical shaft 12 may comprise only one strip that is surface-treated by means of anode oxidation O and only one strip that is coated with the lubricating coating R, these strips thus each extending over an angular sector of 180°. Furthermore, in an embodiment in that the cylindrical shaft 12 comprises two strips that are surface-treated by means of anode oxidation O and two strips that are coated with a lubricating coating R, each strip may extend over angular sectors of 90°. In other embodiments, the two strips that are coated with a lubricating coating R may extend over angular sectors that are between 30 and 90°, and the two strips that are treated by means of anode oxidation O may extend over angular sectors between 90 and 150°, respectively. Such an arrangement assures good electrical conductivity when the fixing element 10 is mounted in an assembly.

Alternatively, the two strips that are coated with a lubricating coating R may extend over angular sectors between 90 and 150°, respectively, and the two strips that have been processed by means of anode oxidation O may extend over angular sectors between 30 and 90°, respectively. This arrangement may provide the assembly of the fixing element 10 with moderate interference.

In still other embodiments, the number of strips processed by means of anode oxidation O and the number of strips coated with the lubricating coating R are not limited to two but may be greater, for example three or four. Other embodiments are illustrated, for example, in FIGS. 2 and 3.

Figure 2:
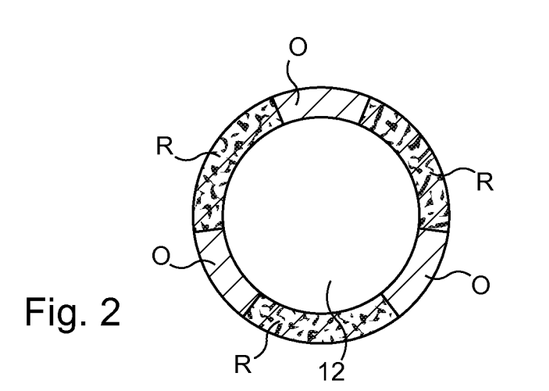
FIGS. 2 and 3 are schematic cross-sections of a fixing element according to alternative embodiments.

In FIG. 2, the cylindrical shaft 12 comprises three strips that have been processed by means of anode oxidation O and that extend over angular sectors of 45° and that are separated in pairs by means of strips that are coated with a lubricating coating R that extends over angular sectors of 75°, respectively.

Figure 3:
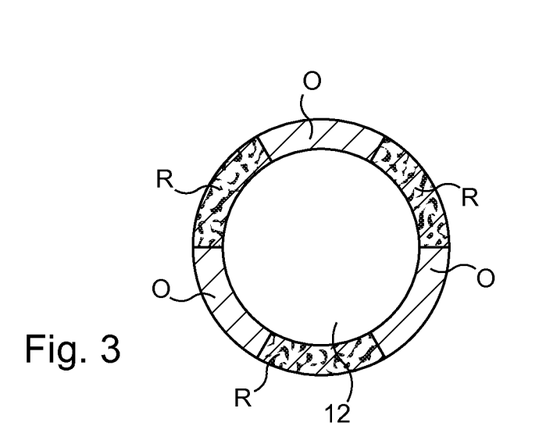

In the embodiment illustrated in FIG. 3, the cylindrical shaft 12 also comprises three strips that are surface-treated by means of anode oxidation O and three strips that are coated with a lubricating coating R. In this embodiment, the longitudinal strips are distributed uniformly around the periphery of the cylindrical shaft 12, extending over angular sectors of 60°, respectively. Of course, these embodiments are by no means limiting in terms of distribution and dimensions of the angular sectors at the periphery of the cylindrical shaft 12 of the fixing element 10.

Figure 4A:
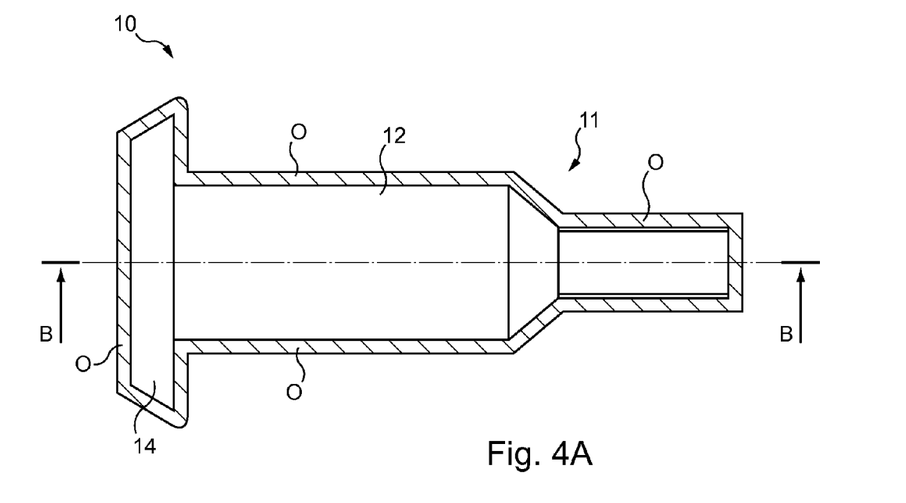
FIG. 4A is a schematic longitudinal section of a fixing element according to a further embodiment.
Figure 4B:
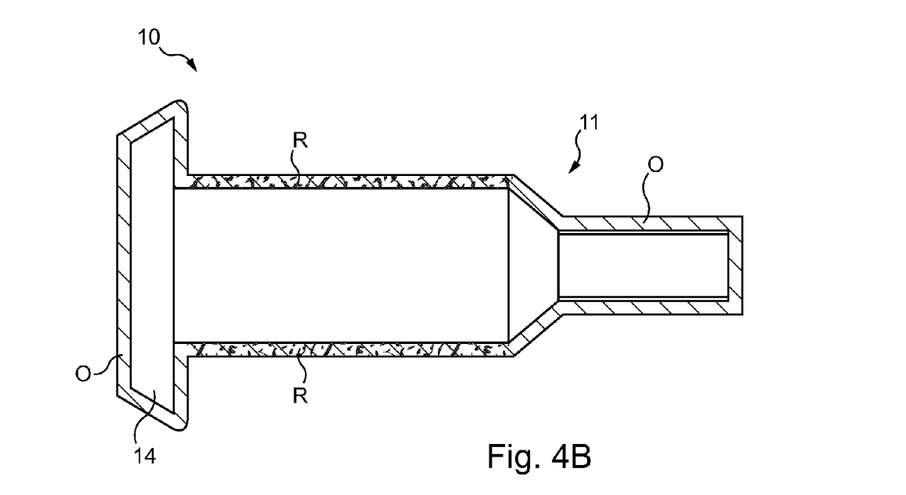
FIG. 4B is a schematic longitudinal section along line BB in FIG. 4A.

Another embodiment will now be described with reference to FIGS. 4A and 4B. The fixing element 10 has portions that are similar to those described above in connection to FIGS. 1A and 1B wherein that like reference numerals denote like elements. In this second embodiment, the head 14 and the end 13 of the rod 11 of the fixing element 10 are surface-treated by means of anode oxidation O. The cylindrical shaft 12 comprises a portion that is surface-treated by means of anode oxidation O and a portion that is coated with a lubricating coating R. The surface-treatment of the fixing element may be a processing operation known as sulphuric anode oxidation (SAO). The lubricating coating may be a coating of HI-KOTE®.

Longitudinal strips of portions of cylindrical shaft 12 processed by means of anode oxidation O, and portions of cylindrical shaft 12 coated with lubricating coating R may be similar to those described above with reference to FIGS. 1A, 1B, 1C, 2, and 3.

Figure 5:
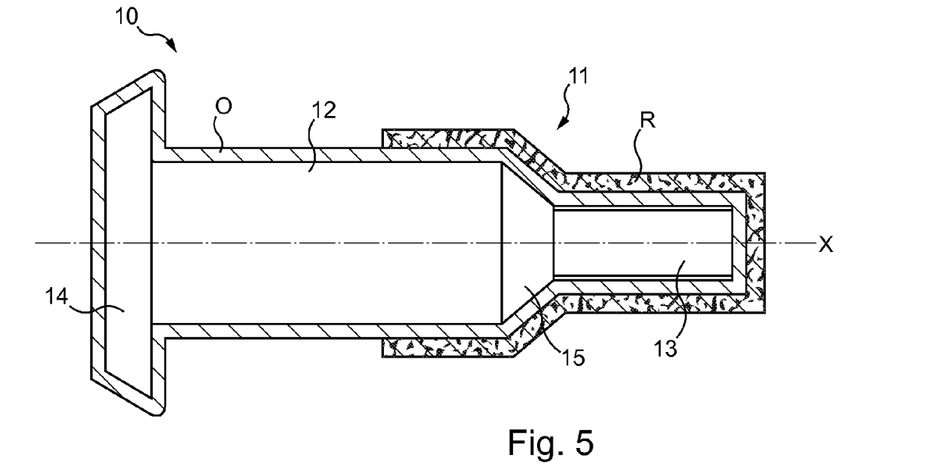
FIG. 5 is a schematic longitudinal section of a fixing element according to a still further embodiment.
Figure 6:
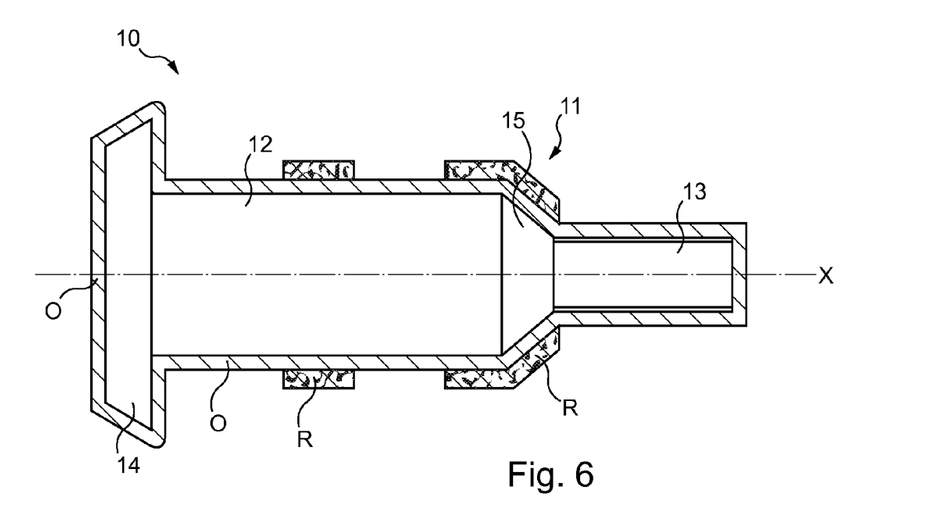
FIG. 6 is a schematic longitudinal section of a fixing element according to yet another embodiment.

FIGS. 5 and 6 illustrate other embodiments of the fixing element 10 wherein a lubricating coating R is applied to an annular portion of the cylindrical shaft 12. In these embodiments illustrated in the fixing element 10 comprises a rod 11 and a head 14 that are surface-treated integrally by means of anode oxidation O. The rod 11 is covered over at least a portion of the cylindrical shaft 12 with a lubricating coating R. In the embodiment shown in FIG. 5, the lubricating coating R is applied both to a portion of the cylindrical shaft 12, the end 13, and the connection zone 15 of the rod 11. However, it is necessary to provide an adequate portion of the cylindrical shaft 12, of which has been treated by means of anode oxidation O in order to ensure adequate electrical continuity with the components of the assembly.

According to an alternative embodiment described in FIG. 6, the lubricating coating R is applied in a plurality of annular strips to the rod 11 of the fixing element 10. The fixing element 10 comprises two annular portions of a lubricating coating R, one arranged at the end of the cylindrical shaft 12, adjacent to the connection zone 15, and the other arranged half-way along the cylindrical shaft 12 in the longitudinal direction X of the cylindrical shaft 12. Of course, the number of annular portions and their relative arrangement in the longitudinal direction X of the fixing element 10 may vary. Once again, the surface-treatment of the fixing element may be a processing operation utilizing sulphuric anode oxidation. The lubricating coating may be a coating of HI-KOTE®.

Figure 7:
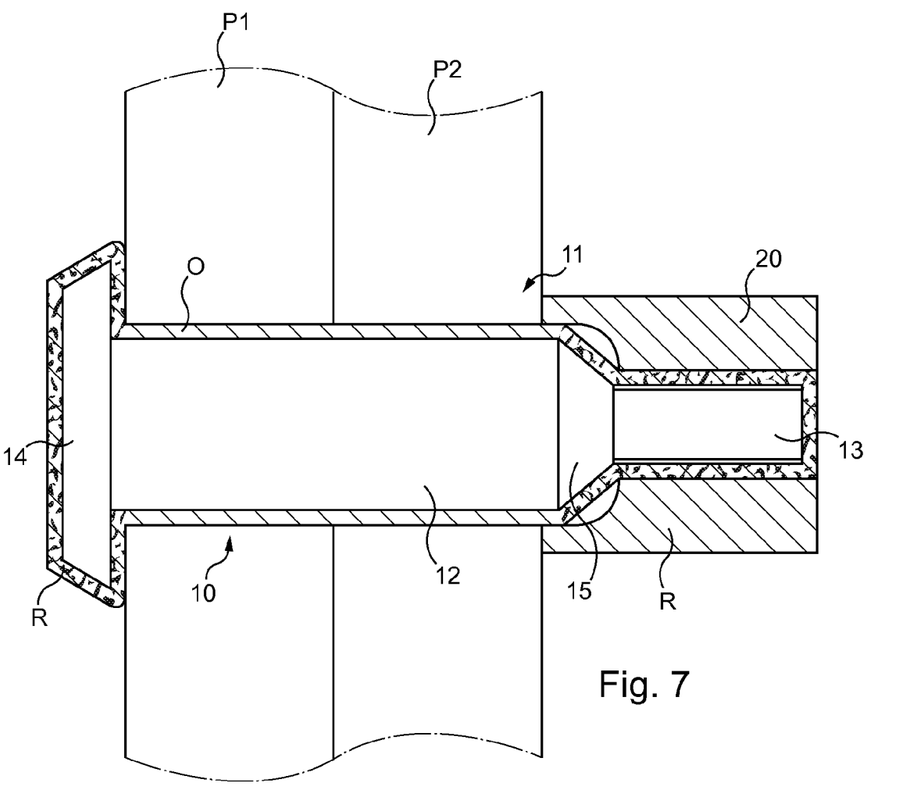
FIG. 7 partially illustrates an assembly of two components which are fixed using a fixing element according to an embodiment.

The fixing element 10 thus described according to different embodiments enables at least two components P1, P2 to be fixed to each other, as illustrated in FIG. 7, to form an assembly. This assembly may comprise two components P1, P2 that correspond to connection panels on an aircraft. Stacked components that constitute the assembly are preferably of composite material, produced from an admixture of fibers and resin. In an embodiment, the composite material may be produced from a matrix of aluminum reinforced with carbon fibers. When the end 13 of the fixing element 10 is threaded, the fixing element 10 cooperates in a known manner with a nut 20 that is mounted on the threaded end 13. The nut 20 moves into contact with one of the components P1, P2 of the assembly, and in this instance the last component P2 of the assembly. Of course, in other embodiments, when the end 13 of the rod 11 is not threaded, the fixing element 10 is mounted in accordance with a staple type principle, using a crimped shearing type fixing member.

When a fixing element 10 is mounted by means of interference, the portions of the cylindrical shaft 12 covered with a lubricating coating R promote the sliding action and thus the assembly with moderate interference of the fixing element 10 in a hole that is provided for this purpose in the components P1, P2 of the assembly. Furthermore, the surface components processed by means of anode oxidation ensure electrical continuity between the fixing element 10 and the components P1, P2, thus ensuring the protection of the assembly against phenomena linked with lightning strikes, in particular in the region of the head 14 of fixing element 10.

In order to obtain good electrical conductivity between the fixing element 10 and the components P1, P2 of the assembly, it is desirable that the surface-area occupied by the lubricating coating R on the rod portion 11 accommodated in the last assembly component, and in this instance the component P2, not exceed 50% of the inner surface-area of the hole produced in the last component P2. In this manner, when the lubricating coating R is arranged in an annular manner on the rod 11 of the fixing element 10, the width of the lubricating coating R in the longitudinal direction X of the fixing element 10 is less than or equal to half of the thickness of the last assembly component P2 also measured in the longitudinal direction X of the fixing element 10.

When the lubricating coating R extends in accordance with one or more strips along the length of the cylindrical shaft 12 of the fixing element 10, the cumulative surface-area of the lubricating coating strips R is less than or equal to 50% of the annular portion of the cylindrical shaft 12.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A fixing element for securing components of an assembly, the fixing element comprising:
   a metal rod comprising a cylindrical shaft extending between a head and an end, and a frustoconical connection portion between the cylindrical shaft and the end, the metal rod comprising:
      a first region that is surface-treated by means of anode oxidation, wherein the first region comprises a first annular ring about the cylindrical shaft and between the head and the frustoconical connection portion; and
      a second region coated with a lubricating coating, wherein the second region comprises a second annular ring about the cylindrical shaft and between the head and the frustoconical connection portion.

2. The fixing element of claim 1, wherein the second region further comprises a third annular ring about the cylindrical shaft and between the head and the frustoconical connection portion.

3. The fixing element of claim 2, wherein the first region further comprises a fourth annular ring about the cylindrical shaft and between the head and the frustoconical connection portion.

4. The fixing element of claim 2, wherein the second region includes the frustoconical connection portion.

5. The fixing element of claim 1, wherein the second annular ring of the second region is contiguous with the lubricating coating on the frustoconical connection portion.

6. The fixing element of claim 1, wherein the rod is at least partially surface-treated by means of sulphuric anode oxidation.

7. The fixing element of claim 6, wherein lubricating coating is a coating comprising phenolic resin.

8. The fixing element of claim 1 wherein the end of the metal rod is threaded and the end is surface-treated by means of anode oxidation.

9. The fixing element of claim 1 wherein the end is coated with the lubricating coating.

10. An aircraft assembly, comprising:
a first component;
a second component; and
a metal rod for securing the first and second components, the metal rod comprising:
a cylindrical shaft extending between a head and an end;
a frustoconical connection portion between the head and the end;
a first region that is surface-treated by means of anode oxidation; and
a second region coated with a lubricating coating,
wherein the first region comprises a first annular ring surface-treated by the anode oxidation, and
wherein the second region comprises a second annular ring about the cylindrical shaft and between the head and the frustoconical connection portion.

11. The aircraft assembly of claim 10, wherein the cylindrical shaft comprises:
at least a first strip that extends in the length of the cylindrical shaft and which is surface-treated by means of anode oxidation; and
at least a second strip that extends in the length of the cylindrical shaft and which is coated with the lubricating coating.

12. The aircraft assembly of claim 11 wherein the cylindrical shaft comprises;
a plurality of first strips that are surface-treated by means of anode oxidation; and
a plurality of second strips that are coated with a lubricating coating, the first and second strips extending over angular sectors that are distributed around the periphery of the cylindrical shaft.

13. The aircraft assembly of claim 12, wherein the oxidation is a sulfur anode oxidation.

14. The aircraft assembly of claim 13 wherein the anode oxidation is substantially 0.5 microns thick.

15. The aircraft assembly of claim 13 wherein the lubricant coating is substantially 5 microns thick.

16. The aircraft assembly of claim 13 wherein the metal rod is titanium.

17. A method for treating a fixing element that secures an aircraft assembly, the fixing assembly including a rod comprised of a cylindrical shaft extending between a head and an end, the method comprising:
surface treating at least a portion of the cylindrical shaft by means of anode oxidation;
coating at least a first region of the cylindrical shaft with a lubricant to provide a first region and a second region on the cylindrical shaft and between the head and the end,
wherein the first region comprises a first annular ring surface-treated by the anode oxidation, and,
wherein the second region corpses a second annular ring coated with the lubricant.

18. A fixing element for securing components of an assembly, comprising:
a metal rod comprising a cylindrical shaft extending between a head and an end, and further comprising:
a first region that is surface-treated by means of anode oxidation; and
a second region coated with a lubricating coating,
wherein the end of the metal rod comprises a threaded end, and,
wherein the first region comprises a first annular ring about the cylindrical shaft and between the head and the threaded end, and,
wherein the second region comprises a second annular ring about the cylindrical shaft and between the head and the threaded end.

* * * * *